United States Patent

Rickabus

Patent Number: 5,855,408
Date of Patent: Jan. 5, 1999

[54] INGRESS AND EGRESS HANDLE ASSEMBLY

[75] Inventor: Ted R. Rickabus, Ortonville, Mich.

[73] Assignee: Lear Corporation, Southfield, Mich.

[21] Appl. No.: 854,078

[22] Filed: May 9, 1997

[51] Int. Cl.$^6$ .................................................. B60R 11/00
[52] U.S. Cl. ...................... 296/214; 296/214; 296/97.1; 190/39; 190/115; 16/112; 16/115; 105/354
[58] Field of Search .................................. 296/214, 97.1; 105/354; 16/112, 115; 190/39, 115; 220/757, 763, 764

[56] References Cited

U.S. PATENT DOCUMENTS

| | | | |
|---|---|---|---|
| 2,163,106 | 6/1939 | Schmidt | 105/354 |
| 2,457,483 | 12/1948 | Martin | 153/48 |
| 2,777,729 | 7/1957 | Nieratko | 296/49.2 |
| 4,390,203 | 6/1983 | Lutz et al. | 296/223 |
| 4,456,219 | 6/1984 | Scott et al. | 251/99 |
| 4,895,403 | 1/1990 | Osenkowski | 292/336.3 |
| 4,981,322 | 1/1991 | Dowd et al. | 296/214 |
| 4,981,323 | 1/1991 | Dowd et al. | 296/214 |
| 5,388,880 | 2/1995 | Kinane | 296/37.7 |
| 5,403,064 | 4/1995 | Mahler et al. | 296/214 |
| 5,465,462 | 11/1995 | Yamada | 16/112 |
| 5,519,917 | 5/1996 | Cordonnier | 296/214 |
| 5,625,921 | 5/1997 | Smith | 16/112 |

FOREIGN PATENT DOCUMENTS 2 026 120  1/1980  United Kingdom ..................... 16/112

Primary Examiner—D. Glenn Dayoan
Assistant Examiner—Kiran Patel
Attorney, Agent, or Firm—Brooks & Kushman P.C.

[57] ABSTRACT

An ingress/egress handle assembly for a vehicle is pivoted between a stowed position and an assist position. The handle assembly is mounted to first and second brackets by way of first and second cams and first and second leaf springs. The cams and leaf springs function to selectively lock the handle into either its stowed position or its assist position. The leaf springs rotate about the cams such that whenever the leaf spring is partially rotated toward its stowed position, the leaf spring snaps the handle to the stowed position. A detent is formed as an offset on a distal end of a leaf portion of the leaf spring. The handle, brackets and leaf springs are secured together by a pin about which the handle rotates.

10 Claims, 3 Drawing Sheets

INGRESS AND EGRESS HANDLE ASSEMBLY

TECHNICAL FIELD

The present invention relates to a vehicle ingress and egress handle assembly.

BACKGROUND OF THE INVENTION

Vehicle ingress and egress handle assemblies are provided on vehicles to assist passengers in getting into and out of cars and trucks. Such handles are typically mounted above the door jam or on the upper portion of a door hinge pillar.

Fixed handles suffer from disadvantages associated with passengers bumping their heads on the handles as they enter or exit the vehicle. To minimize this disadvantage, fixed handles may be located in more difficult to reach locations which tend to limit their usefulness.

Another approach is disclosed in U.S. Pat. Nos. 4,981,322 and 4,981,323 which disclose an assist strap for a modular headliner which has an ingress/egress handle that is biased to a stowed position by a helical spring. While this approach keeps the handle in its stowed position and out-of-the-way, this device is a relatively expensive multi-piece assembly which is normally retained in the "up" or stowed position. The helical spring prevents the handle from being held in its "down" or deployed position. This type of assist handle is of limited utility for passengers who are unfamiliar with the location of the handle because it cannot be seen from the exterior of the car.

Similarly, U.S. Pat. No. 5,403,064 discloses attachment parts for a hand grip for the interior of a vehicle. This patent discloses a spring biased hand grip which may be provided with an undisclosed blocking device which can hold the grip body in the swing-out position during the hand grip installation process. This patent fails to disclose the concept of providing an ingress/egress handle which may be deployed in a stowed or a deployed position in which it is visible to persons entering the vehicle. It also fails to disclose a handle that will automatically retract to the stowed position if it is bumped or contacted while in the deployed position during either ingress or egress. It also fails to disclose a handle that will automatically retract if the handle is contacted by a passenger within the vehicle.

Accordingly, a need exists for a simple, cost-effective vehicle ingress/egress handle that may be retained in either its stowed or deployed position and that automatically retracts upon being contacted while in the deployed position. Applicant's invention, as summarized below, is believed to provide these advantages while addressing the disadvantages associated with the prior art devices noted above.

SUMMARY OF THE INVENTION

According to this invention, a handle assembly that is secured to a vehicle for assisting persons during ingress and egress from the vehicle is provided. The handle has two ends and is secured to the vehicle by two brackets. At least one spring biased gripping element is provided on at least one of the ends of the handle. At least one cam is provided on at least one of the two brackets. The gripping element releasably locks onto the cam to hold the handle in the assist position until a certain level of force is applied in the direction the handle is moved to be placed in the stowed position. When this force is applied to the handle in the assist position, the spring biased gripping element releases the cam and snaps the handle to the stowed position.

According to another aspect of the invention, a handle assembly that is mounted on a headliner of a vehicle for assisting persons during ingress and egress from the vehicle is provided. The handle assembly comprises a handle having a grip section disposed between first and second legs. The legs define first and second pockets. First and second mounting brackets are adapted to be secured to the vehicle through the headliner. The mounting brackets each have a cam member. First and second leaf springs are assembled to the first and second pockets. The leaf springs each have a back portion and a leaf portion to engage one of the cam members. A pin connects the handle, first and second mounting brackets and first and second leaf springs together for pivotable movement between the stowed position (with the handle up against the headliner) and an assist position (with the handle in a lowered, easy to grasp orientation). A detent element releasably locks onto the cam member to hold the handle in the assist position until a threshold level of force is applied in the direction the handle pivots to be placed in the stowed position. Upon application of the threshold level of force, the first and second leaf springs snap the handle into the stowed position.

According to another aspect of the invention, as described above, the brackets include first and second cams which are solid cams having first and second rounded ends on opposite ends of top and bottom substantially flat sides.

According to another aspect of the invention, as described above, the spring biased gripping elements or leaf springs are assembled into the pockets in the handle with a back portion and a leaf portion of the gripping elements (or leaf springs) engaging top and bottom sides of the solid cams, respectively, in the stowed position and the first and second rounded ends engaging the back portion and the leaf portion, respectively, in the assist position.

According to another aspect of the invention, as described above, the spring biased gripping elements (or leaf springs) have an offset portion on a distal end of the leaf portion which functions as the detent element for holding the handle in the assist position.

These and other features and objects of the invention will be better understood upon reviewing the attached drawings and detailed description of the invention.

DETAILED DESCRIPTION OF THE INVENTION

Figure 1:
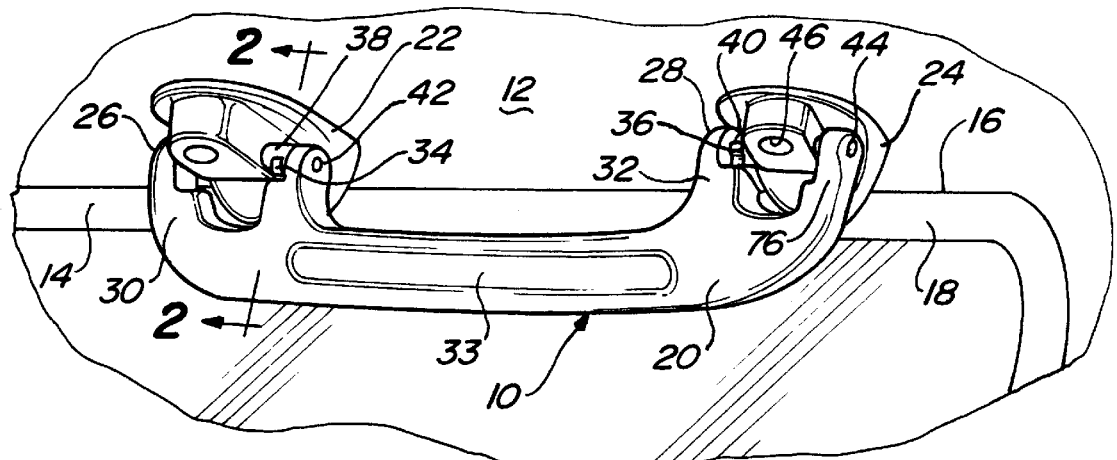
FIG. 1 is a perspective view of an ingress and egress handle assembly assembled to a vehicle.

Referring now to FIG. 1, the invention is described in greater detail. A handle assembly 10 is secured to a headliner 12 of a vehicle 14. The vehicle 14 may be a car, truck or other vehicle. The handle assembly 10 is mounted adjacent a door jam 16 that receives a door 18. The handle assembly 10 includes a handle 20 and first and second brackets 22 and 24.

The handle 20 has first and second ends 26 and 28 that are generally hollow members that also may be referred to as pockets. First and second ends 26 and 28 are formed on first and second legs 30 and 32 of the handle 20. A grip section 33 is provided between the first and second legs 30 and 32 of the handle 20.

First and second leaf springs 34 and 36 are assembled within the pockets 26 and 28, respectively. First and second cams 38 and 40 are provided on the first and second brackets 22 and 24, respectively. First and second cams 38 and 40 are solid cams that are specially shaped to cooperate with the first and second leaf springs 34 and 36 as is more fully described below. If desired, two cams may be provided on each bracket.

The handle assembly 10 is held together by first and second pins 42 and 44 which pivotally secure the handle 20, first and second leaf springs 34 and 36, and first and second brackets 22 and 24 together. The handle 20 is pivotally secured to first and second brackets 22 and 24.

Leaf springs 34 and 36 and cams 38 and 40 cooperate to lock the handle in either a stowed position or in an assist position. The leaf springs 34 and 36 function to snap the handle 20 from its assist position to a stowed position when contacted with a predetermined amount of force tending to pivot the handle toward its stowed position.

Figure 2:
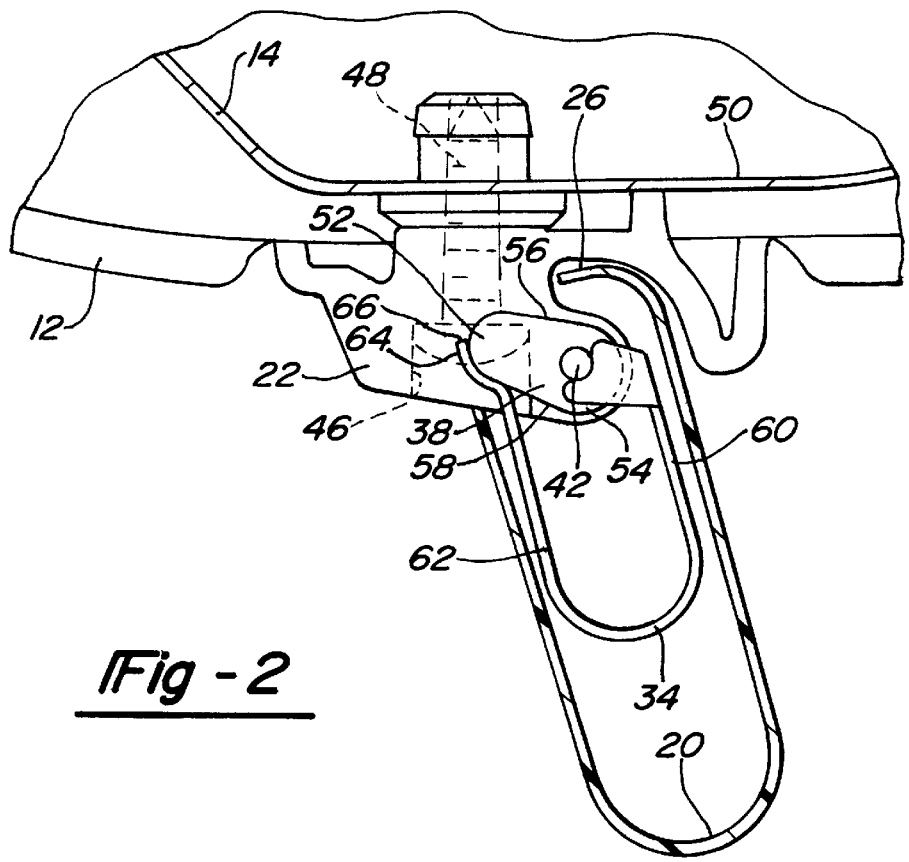
FIG. 2 is a cross-sectional view taken along the line 2—2 in FIG. 1 showing the handle in its assist position.
Figure 3:
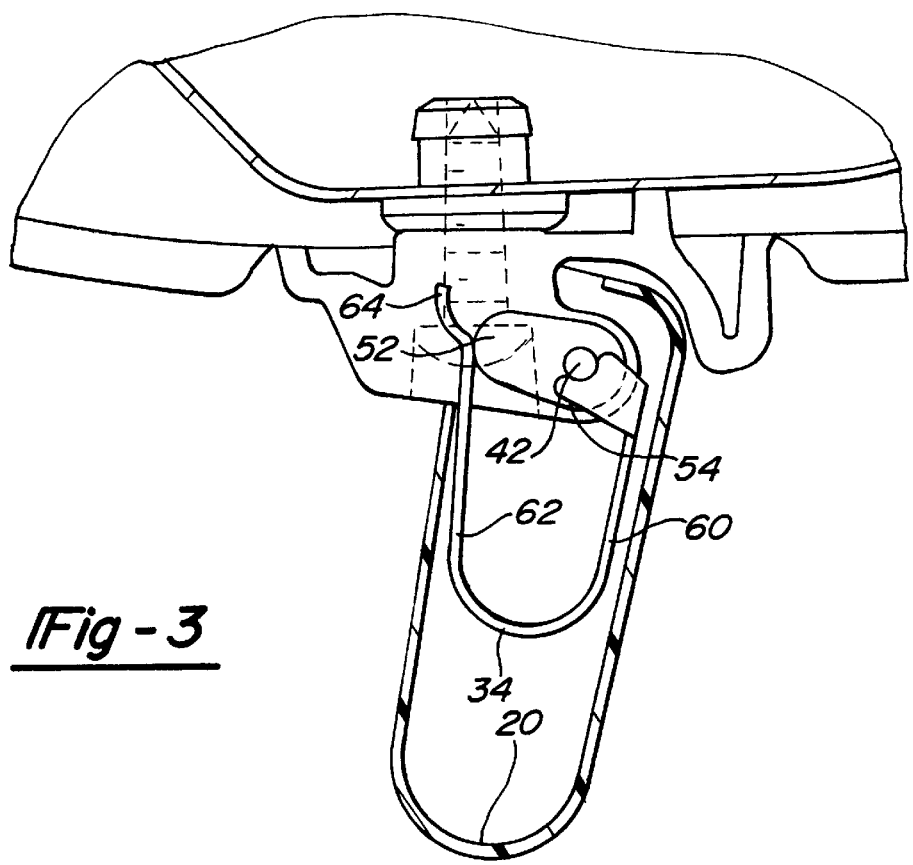
FIG. 3 is a cross-sectional view similar to the cross section of FIG. 2 with the handle in a partially deployed position.
Figure 4:
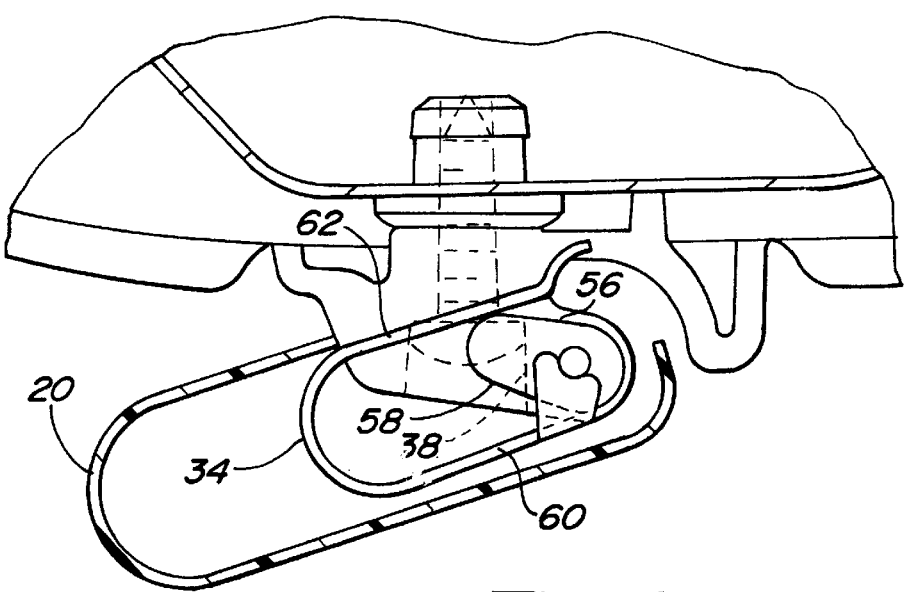
FIG. 4 is a cross-sectional view similar to FIG. 2 showing the handle in its stowed position.

Referring now to FIGS. 2 through 4, operation of the handle 20 is explained in reference to the handle being in its assist position, intermediate position, and its stowed position, respectively. As shown in FIG. 2, the bracket 22 is secured to the vehicle 14 through the headliner 12. The bracket 22 has an opening 46 through which an anchor 48 is inserted to secure the bracket 22 to a roof rib 50 of the vehicle 14.

First cam 38 includes first and second rounded ends 52 and 54 that join opposite ends of top and bottom flat sides 56 and 58. Top and bottom flat sides 56 and 58 may be parallel or angled relative to each other depending upon the desired action of the handle. First and second rounded ends 52 and 54 are rounded to provide a smooth transition between the stowed and assist positions of the handle 20.

First leaf spring 34 includes a back portion 60 and a leaf portion 62. First cam 38 is retained between the back portion 60 and leaf portion 62 of first leaf spring 34. When the handle is in the assist position, the back portion 60 engages the second rounded end 54 while the leaf portion 62 engages the first rounded end 52. An offset portion 64 is provided on the distal end 66 of the leaf portion 62.

Referring now to FIG. 3, as the handle 20 is pivoted towards its stowed position, first leaf spring 34 pivots with the handle 20 about first pin 42. Back portion 60 and leaf portion 62 move around the first and second rounded ends 52 and 54. The offset portion 64 initially provides greater resistance to rotation until the leaf portion 62 is rotated partially about the first rounded end 52.

Referring now to FIG. 4, the handle 20 is shown rotated almost completely to its stowed position. First leaf spring 34 has rotated almost to its stowed position wherein the leaf portion 62 is adjacent to top flat side 56 of first cam 38. The back portion 60 is also almost rotated to its final stowed position where the back portion 60 is adjacent to bottom flat side 58.

The preceding description of the operation of the handle 20 is described in reference to first bracket 22. It should be understood that the second bracket 24 preferably functions in a similar manner. To avoid duplication, a detailed description of the second bracket 24 is omitted because essentially the same description applies to second end 28, a second leaf spring 36, second cam 40 and second pin 44 as the first bracket 22, first end 26, first leaf spring 34, first cam 38 and first pin 42 described above.

It should also be understood that while the spring is carried by the handle and the cam is formed on the bracket, this relationship could be reversed without departing from the inventive concept.

Figure 5:
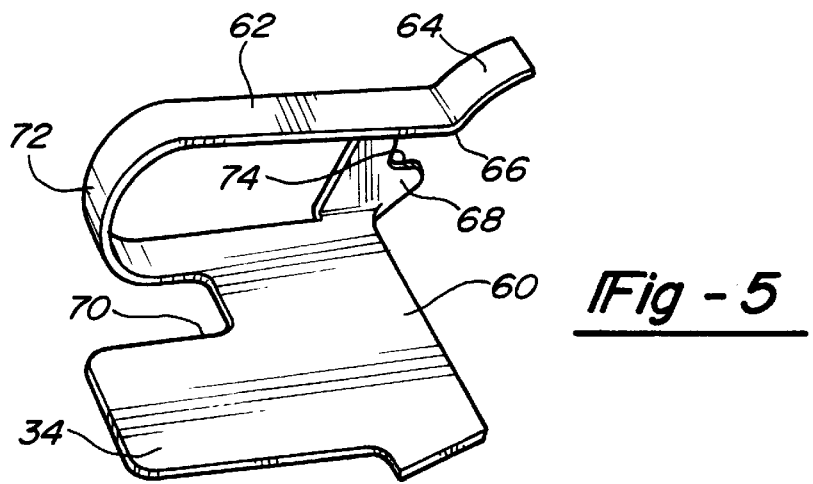
FIG. 5 is a perspective view of a leaf spring utilized in practicing the present invention.
Figure 6:
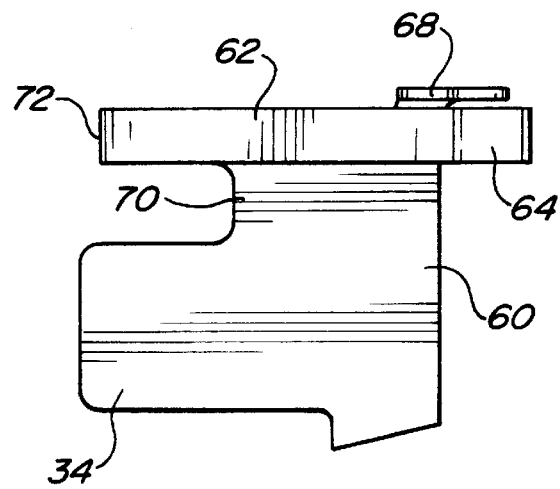
FIG. 6 is a plan view of the leaf spring.
Figure 7:
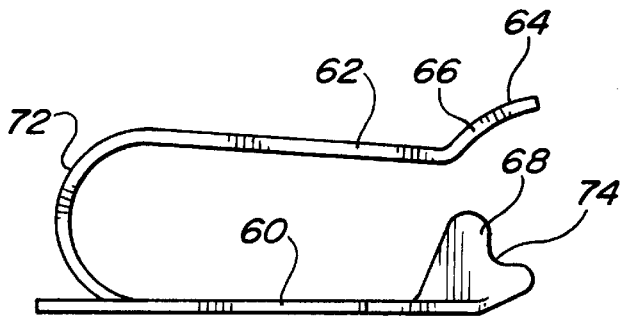
FIG. 7 is a side elevation view of the leaf spring.

Referring now to FIGS. 5, 6, and 7, the leaf spring 34 is shown in isolation. It should be also understood that the second leaf spring 36 is preferably formed as the mirror image of first leaf spring 34 or alternatively could be formed as an identical leaf spring to aid in inter-changeability of parts. In addition, two or more leafs can be provided on each leaf spring, especially if two or more cams are provided on each bracket.

Referring now to FIGS. 5 through 7, the first leaf spring 34 includes the back portion 60 and leaf portion 62. At the distal end 66 of the leaf portion 62 an offset portion 64 is formed in an arcuate shape. A retention flange 68 is formed to extend perpendicularly from the back portion 60 to retain the first leaf spring 34 on the first bracket 22 and prevent axial displacement of the first leaf spring 34 that could result in its separation from the first cam 38. A clearance slot 70 is formed in the back portion 60. A rib (not shown) formed in the handle 20 may be received within the clearance slot 70 to assure that the parts are retained in the proper position. A reverse bend 72 interconnects the back portion 60 to the leaf portion 62. A pin cutout 74 is formed in the retention flange 68. When the first leaf spring 34 is assembled to the first bracket 22, first pin 42 extends through the first bracket 22 and a hole 76 formed in the first end 26 of the handle 20. Pin cutout 74 allows for insertion of the first pin 42.

The preceding description of a best mode of the invention is intended to be understood as an example and should not be read to limit the invention. The broad scope of Applicant's invention should be construed based upon the following claims.

What is claimed is:

1. A handle assembly secured to a vehicle for assisting persons during ingress and egress from the vehicle, comprising:

a handle having first and second ends;

first and second brackets secured to the vehicle;

at least one spring biased gripping element is provided on at least one of said first and second ends of said handle;

at least one cam is provided on at least one of said first and second brackets;

said spring biased gripping element releasably locks onto the cam to hold the handle in an assist position until a predetermined level of force is applied in the direction the handle is moved to be placed in a stowed position, whereby application of at least the predetermined level of force to the handle when in the assist position causes the spring biased gripping element to release the cam and snap the handle to the stowed position.

2. The handle assembly of claim 1 wherein said first and second brackets include an opening for receiving an anchor which is adapted to be secured to a roof rib of the vehicle.

3. The handle assembly of claim 1 wherein said first and second brackets include a first cam and a second cam, wherein said first and second cams are solid cams having first and second rounded ends and top and bottom substantially flat sides.

4. The handle assembly of claim 3 wherein said first and second spring biased gripping elements are formed by first and second leaf springs which are assembled into first and second pockets formed by first and second ends of said handle, said leaf springs having a back portion and a leaf portion which engage said cams, wherein said top and bottom sides of said cams are engaged by said back portion and leaf portion, respectively, in the stowed position and wherein said first and second rounded ends are engaged by said back portion and said leaf portion, respectively, in the assist position.

5. The handle assembly of claim 4 wherein said first and second spring biased gripping elements have an offset portion on a distal end of the leaf portions which function as a detent for holding the handle in the assist position.

6. The handle assembly of claim 1 wherein first and second pins secure said first and second ends of said handle, first and second brackets and said first and second spring biased gripping elements together, respectively, to permit the handle to pivot between the stowed position and the assist position.

7. A handle assembly mounted on a headliner of a vehicle for assisting persons during ingress and egress from the vehicle, comprising:

a handle having a grip section disposed between first and second legs, said first and second legs defining first and second pockets;

first and second mounting brackets adapted to be secured to the vehicle through the headliner, said first and second mounting brackets each having a cam member;

first and second leaf springs assembled to said first and second pockets, respectively, said first and second leaf springs each having a back portion that is secured to within one of said pockets and a leaf portion that engages one of the cam members;

a pin connecting the handle, first and second mounting brackets, and first and second leaf springs together to allow the handle to pivot between a stowed position with the handle up against the headliner and an assist position with the handle in a lowered, easy to grasp orientation;

a detent element releasably locks onto the cam member to hold the handle in the assist position until a threshold level of force is applied in the direction the handle pivots to be placed in the stowed position, whereby upon application of at least the threshold level of force, the first and second leaf springs snap the handle into the stowed position.

8. The handle assembly of claim 7 wherein said first and second brackets include a first cam and a second cam, said first and second cams being solid cams having first and second rounded ends on opposite ends of top and bottom substantially flat sides.

9. The handle assembly of claim 8 wherein said first and second leaf springs are formed by first and second springs which are assembled into said first and second pockets in said handle, said leaf springs having a back portion and a leaf portion that engage said cams, wherein said top and bottom sides of said cams are engaged by said back portion and leaf portion, respectively, in the stowed position and wherein said first and second rounded ends are engaged by said back portion and said leaf portion, respectively, in the assist position.

10. The handle assembly of claim 9 wherein said first and second leaf springs have an offset portion on a distal end of the leaf portions which function as the detent element for holding the handle in the assist position.

\* \* \* \* \*